US008246842B2

(12) United States Patent
Frohlich, Jr.

(10) Patent No.: US 8,246,842 B2

(45) Date of Patent: Aug. 21, 2012

(54) SCREEN BOWL CENTRIFUGE

(75) Inventor: Nicholas Robert Frohlich, Jr., Lebanon, OH (US)

(73) Assignee: Andritz Separation, Inc., Arlington, TX (US)

( * ) Notice: Subject to any disclaimer, the term of this patent is extended or adjusted under 35 U.S.C. 154(b) by 694 days.

(21) Appl. No.: 12/411,523

(22) Filed: Mar. 26, 2009

(65) Prior Publication Data

US 2009/0247383 A1 Oct. 1, 2009

Related U.S. Application Data

(60) Provisional application No. 61/040,254, filed on Mar. 28, 2008.

(51) Int. Cl.
*B01D 1/20* (2006.01)
*B01D 3/04* (2006.01)

(52) U.S. Cl. ..................... 210/781; 210/787; 210/360.1; 210/374; 210/380.1; 494/37; 494/53

(58) Field of Classification Search .................. 210/781, 210/787, 360.1, 374, 380.1; 494/37, 53
See application file for complete search history.

(56) References Cited

U.S. PATENT DOCUMENTS

| | | | |
|---|---|---|---|
| 4,226,724 | A | 10/1980 | Stürmer |
| 4,983,289 | A | 1/1991 | Salomon |
| 5,584,791 | A | 12/1996 | Grimwood et al. |
| 6,241,901 | B1 | 6/2001 | Leung |

FOREIGN PATENT DOCUMENTS

| | | | |
|---|---|---|---|
| DE | 3324973 | A1 | 1/1985 |
| EP | 0 678 333 | A1 | 10/1995 |
| GB | 2 064 997 | A | 6/1981 |
| GB | 2 145 944 | A | 4/1985 |

OTHER PUBLICATIONS

English Machine Translation of Japanese Patent 3 775 659B which corresponds to WO 01/43882 A1 submitted on Jul. 7, 2009.

International Search Report and the Written Opinion of the International Searching Authority mailed Jun. 22, 2009 in International Application No. PCT/US2009/038354.

*Primary Examiner* — David A Reifsnyder

(74) *Attorney, Agent, or Firm* — Nixon & Vanderhye P.C.

(57) ABSTRACT

A centrifuge (2) for separating solids from liquid of a slurry with a conveyor (12) having a hub (14) rotatable about an axis (34) and at a helical blade (16) extending axially and radially from the hub. A bowl (4) including a cylindrical section (6) extending from an upstream end of the conveyor and a conically diverging screen section (10) extending to a downstream end of the conveyor extends about the conveyor and is rotatable about the axis. The conically diverging screen section includes an angle (40) that reduces the coefficient of friction of the solids to allow a cake formed of the solids to slide in a controlled manner forward on the conically diverging screen section with minimal back pressure, but without allowing the solid cake to break loose from the conically diverging screen section and slide out of the centrifuge in an uncontrolled manner.

19 Claims, 1 Drawing Sheet

SCREEN BOWL CENTRIFUGE

CROSS REFERENCE TO RELATED APPLICATION

This application claims priority to U.S. Application 61/040,254, filed Mar. 28, 2008, the entire contents of which are incorporated herein by reference.

FIELD OF THE INVENTION

The present invention relates to decanting screen bowl centrifuges for separating a slurry into its constituent solids and liquid.

BACKGROUND OF THE INVENTION

Decanting centrifuges include a bowl that is rotatably driven about a horizontal or vertical axis and contains a helical scroll, or worm-type, conveyor to separate a slurry fed into the bowl at a first end into its constituent solids and liquid(s). The conveyor rotates at a different speed within the bowl to scroll the heavier solids to discharge ports at a second end of the bowl. The separated liquid flows primarily in the opposite direction and is discharged from ports at the first end of the bowl. The decanting centrifuge can be of two general types, either solid bowl or screen bowl. In the latter, the solids are scrolled by the conveyor over an additional perforated screen section of the bowl prior to discharge.

Existing decanting centrifuges of both the solid and screen bowl types operate when fed with a slurry containing solids either to separate the solid particles from the liquid, or to classify the solids, that is to divide the solids so that particles above a certain size are discharged as solids and particles below that size are discharged with the liquid.

A limitation on the design and operation of large decanting centrifuges is the torque required to drive the conveyor. A number of factors contribute to the torque requirement, with the frictional effect of the solids being conveyed over the screen section being a major component of the required torque. One approach to reducing the torque requirement has been to provide the screen section of the bowl in a diverging frusto-conical form, considered in the directions towards the solids outlet, or discharge end. This arrangement reduces the conveyor torque requirements as the centrifugal forces on the solids assist passage of the solids along the diverging screen section. Reducing the conveyor torque requirement permits a reduction in the size and cost of the conveyor drive including, for example the gearbox, and/or a reduction in the total power consumption of the centrifuge. The use of the diverging screen section also provides a higher G factor and improves dewatering. Increasing feed rates also increase cake pile heights which have an adverse effect on product moisture. The diverging screen causes the cake pile height to become lower, resulting in better dewatering.

SUMMARY OF THE INVENTION

According to one embodiment, a centrifuge comprises a conveyor comprising a hub rotatable about an axis and at least one helical blade extending radially from the hub and in the axial direction of the hub. A bowl extends about the conveyor and is rotatable about the axis. The bowl comprises a cylindrical section extending from an upstream end of the conveyor and a conically diverging screen section extending to a downstream end of the conveyor that reduces the coefficient of friction of the solids to a point that allows the cake formed of the solids to slide in a controlled manner forward on the conically diverging screen section with minimal back pressure but without allowing the solid cake to break loose from the conically diverging screen section and slide out of the centrifuge in an uncontrolled manner. The bowl may also comprise a conically converging section between the cylindrical section and the conically diverging section.

According to another embodiment, the at least one helical blade does not extend along the conically diverging screen section.

According to yet another embodiment, a method of separating solids from liquid of a slurry comprises feeding a slurry from a conveyor hub to a cylindrical section of a bowl extending about the conveyor hub; scrolling the solids along the cylindrical section in a first direction and a majority of the liquid in a second direction opposite the first direction using at least one helical blade extending from the conveyor hub; and sliding the solids from the cylindrical section along a conically diverging screen section of the bowl that reduces the coefficient of friction of the solids to a point that allows the cake formed of the solids to slide in a controlled manner forward on the conically diverging screen section with minimal back pressure but without allowing the solid cake to break loose from the conically diverging screen section and slide out of the centrifuge in an uncontrolled manner.

According to a still further embodiment, the at least one helical blade does not extend along the conically diverging screen section.

Other aspects, features, and advantages will become apparent from the following detailed description when taken in conjunction with the accompanying drawings, which are a part of this disclosure and which illustrate, by way of example, principles of the invention.

BRIEF DESCRIPTION OF THE DRAWINGS

The accompanying drawings facilitate an understanding of the various embodiments. In such drawings.

DETAILED DESCRIPTION OF ILLUSTRATED EMBODIMENTS

Figure 1:
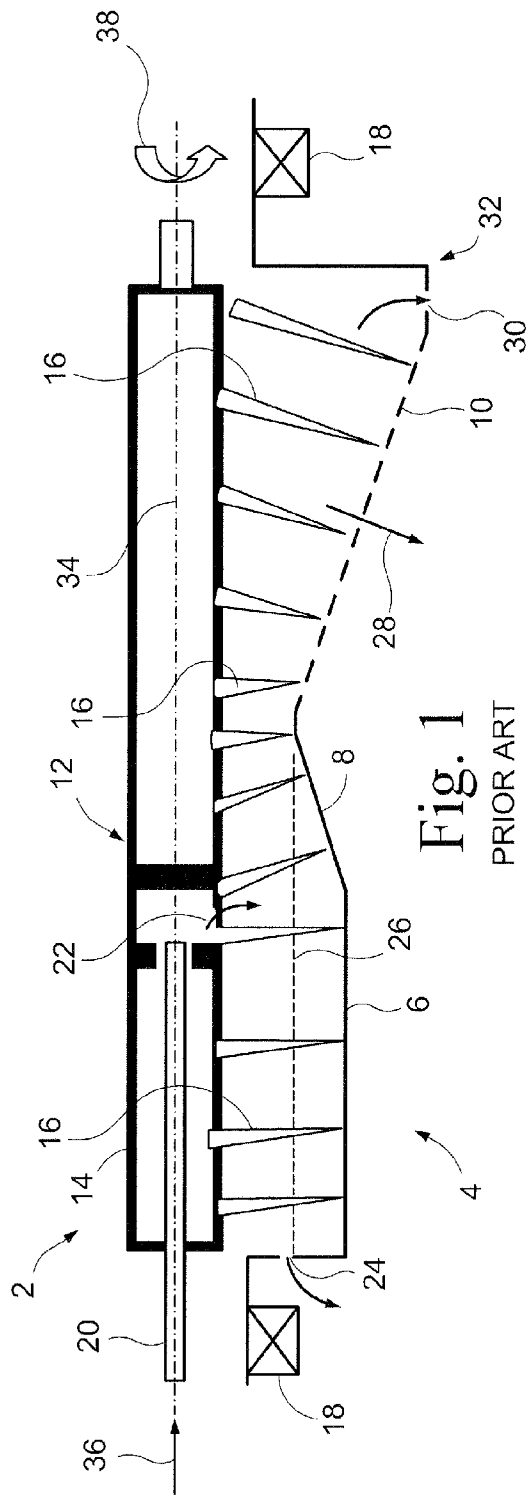
Fig. 1 PRIOR ART
FIG. 1 schematically illustrates a screen bowl centrifuge according to the prior art.

Referring to FIG. 1, a centrifuge 2 according to the prior art comprises a bowl 4 having a cylindrical section 6, a first, frusto-conical section 8 that converges toward the longitudinal axis 34 of the centrifuge 2, and a second, frusto-conical section 10 that diverges from the longitudinal axis 34. The second, frusto-conical diverging section 10 is in the form of a screen.

The centrifuge 2 further comprises a conveyor 12 that includes a conveyor hub 14. The conveyor 12 further comprises helical blades 16 extending radially from the conveyor hub 14. As shown in FIG. 1, the conveyor helical blades 16 extend along the entire length, or nearly the entire length, of the conveyor hub 14. It should be appreciated that the helical blades 16 may comprise a single, continuous helical blade or multiple blades extending around the conveyor hub 14.

The bowl 4 is supported at both ends by bearings 18. Although not shown, it should be appreciated that the conveyor 12 is also supported at both ends by bearings or bushings. A conveyor drive unit 38 is provided at a discharge end 32 or opposite end of the centrifuge 2 to rotate the bowl 4 and the conveyor 12. The conveyor drive unit 38 is configured to drive the bowl 4 and the conveyor 12 at different speeds relative to each other.

A feed pipe 20 is provided in the conveyor hub 14 and delivers a slurry 36 into the conveyor hub 14. The conveyor hub 14 comprises feed ports 22 that feed the slurry 36 into the bowl 4. The bowl 4 includes a liquid outlet 24 through which the liquid component of the slurry is removed thereby maintaining a liquid level 26 in the bowl 4.

The blades 16 of the conveyor 12 convey the solids of the slurry 36 along the centrifuge 2 from the feed ports 22 to the discharge end 32 of the bowl 4. The rotation of the conveyor 12 also causes the blades 16 to force the liquid of the slurry 36 primarily toward the liquid outlet 24.

The first, frusto-conical converging section 8 of the bowl 4 provides a sloping ramp up which solids are drawn by the conveyor 12 out of the liquid pool contained in the bowl 4. The first, frusto-conical converging section 8 thus provides a drying area for the solids conveyed out of the liquid pool. The conveyor 12 then delivers the solids to the second, frusto-conical diverging section 10 of the bowl 4 for further removal of water as depicted by reference number 28 from the screen that forms the second, frusto-conical diverging section 10. The blades 16 of the conveyor 12 then deliver the solids to a solids outlet 30 of the second frusto-conical diverging screen section 10 at the discharge end 32 of the bowl 4.

As shown in FIG. 1, the conveyor blades 16 extend along nearly the entire axial length of the conveyor hub 14 of the conveyor 12. The provision of the conveyor blades 16 along the entire length of the conveyor hub 14 requires that the drive unit 38 be capable of delivering a high torque. This high torque requirement thus results in an increased size and cost of a gear box associated with the drive unit 38. The provision of the conveyor blades 16 along nearly the entire length of the conveyor hub 14 also increases the weight of the conveyor, which results in increased wear in the bearings 18 and conveyor face.

Figure 2:
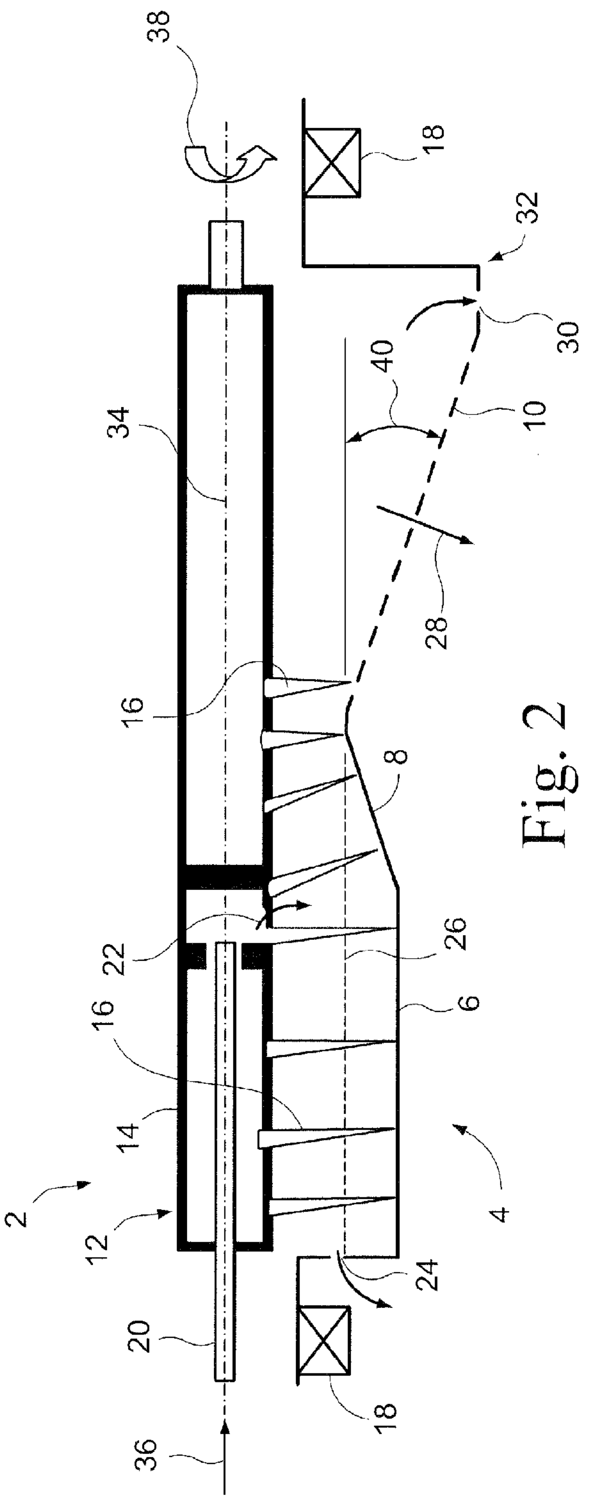
FIG. 2 schematically illustrates a screen bowl centrifuge according to an embodiment of the invention.

Referring to FIG. 2, a centrifuge 2 according to a sample embodiment of the invention includes a bowl 4 having a cylindrical section 6, a first, frusto-conical converging section 8, and a second, frusto-conical diverging section 10 in the form of a screen. The centrifuge 2 also includes a conveyor 12 that includes a conveyor hub 14 that receives a feed pipe 20 for feeding a slurry 36 into the conveyor hub 14. The conveyor hub 14 also includes feed ports 22 that feed the slurry 36 into the cylindrical section 6 of the bowl 4. It should be appreciated that the slurry may be fed to the junction of the cylindrical section 6 and the first, frusto-conical converging section 8, or that the slurry may be fed onto the first, frusto-conical converging section 8.

The bowl 4 includes a liquid outlet 24 that maintains the slurry at a liquid level 26 in the cylindrical section 6 of the bowl 4. The cylindrical section 6 and the first, frusto-conical converging section 8 may be imperforate, or solid. It should be appreciated, however, that a short, cylindrical screen section may also be provided between the first, frusto-conical converging section 8 and the second, frusto-conical diverging screen section 10.

As shown in FIG. 2, the conveyor hub 14 includes helical conveyor blades 16 along the length of the conveyor hub 14. It should be appreciated that the helical blades 16 may comprise a single, continuous helical blade extending around the conveyor hub 14, or multiple blades.

The screen section 10 includes a divergent angle 40 with respect to the longitudinal axis 34 of the centrifuge that reduces the coefficient of friction μ of the solids to a point that allows the cake formed of the solids to slide in a controlled manner forward on the screen section 10 with minimal back pressure, but without allowing the solid cake to break loose from the screen section 10 and slide out of the centrifuge 2 in an uncontrolled manner. The divergent angle 40 should be selected such that the solids may be frictionally advanced over the screen section 10 in an amount of time that allows the additional liquid 28 to be removed from the solids. If the divergent angle 40 is too large, the solids will pass over the screen section 10 too quickly and the additional liquid 28 will not be sufficiently removed form the solids. The value of the divergent angle 40 will depend upon numerous factors, including the composition of the slurry 36 and the form of the screen section 10, including, for example, the mesh of the screen section 10, or the size of the openings in the screen section 10. The divergent angle 40 may have a value, for example, of 5-40°.

Unlike the prior art shown in FIG. 1, the conveyor 12 of the embodiment of FIG. 2 may not include helical conveyor blades 16 in the second, frusto-conical diverging screen section 10 of the centrifuge 2. Eliminating the conveyor blades 16 from the conveyor 12 in the region of the screen section reduces the torque requirements of the drive unit 38 of the centrifuge 2 and increases screen dewatering time. The elimination of the conveyor blades 16 in the divergent screen section 10 also reduces the weight of the conveyor 12, which reduces the load on the bearings 18. The centrifuge 2 of the embodiment of FIG. 2 also provides improved dewatering of additional liquid 28 from the conically diverging screen section 10, reduces the coefficient of friction μ of the solids along the conically diverging screen section 10 and provides a thinner cake depth of the solids. The divergent angle 40 also increases the G factor on the product cake.

The centrifuge of the embodiment of FIG. 2 provides increased reliability and reduced maintenance over the prior art centrifuge, for example as shown in FIG. 1. The centrifuge of the embodiment of FIG. 2 provides improved process performance over the prior art centrifuge regarding the final product moisture, and also significantly increases the centrifuge's capacity, which makes the machine more cost effective from the standpoint of power consumption, capital costs per capacity, and maintenance costs per capacity.

Although the divergent angle 40 shown in FIG. 2 is shown as a continuous angle, it should be appreciated that the divergent angle 40 may be either a continuous or discontinuous angle, or a combination of angles and flat sections.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A centrifuge comprising:

a conveyor comprising a hub rotatable about an axis and a helical blade extending radially from the hub and in the axial direction of the hub; and a bowl extending about the conveyor and rotatable about the axis, the bowl comprising a cylindrical section extending from an upstream end of the conveyor and a conically diverging screen section extending to a downstream end of the conveyor, wherein the conically diverging screen section extends at an angle to the axis of the hub that reduces the coefficient of friction of the solids to a point that allows the cake formed of the solids to slide in a controlled manner forward on the conically diverging screen section with minimal back pressure but without allowing the solid cake to break loose from the conically diverging screen section and slide out of the centrifuge in an uncontrolled manner and, wherein the helical blade and all blades extending radially from the hub to the bowl terminate upstream of the conically diverging screen section.

2. A centrifuge according to claim 1, wherein the bowl further comprises a conically converging section between the cylindrical section and the conically diverging screen section.

3. A centrifuge according to claim 2, further comprising a cylindrical screen section between the conically converging section and the conically diverging screen section.

4. A centrifuge according to claim 1, further comprising:
a feed pipe configured to deliver a slurry to the upstream end of the conveyor hub.

5. A centrifuge according to claim 1, further comprising:
a drive unit configured to rotatably drive the conveyor hub and the bowl about the axis relative to each other.

6. A centrifuge according to claim 1, further comprising:
bearings configured to support the conveyor hub and the bowl at the upstream and downstream ends.

7. A centrifuge according to claim 1, wherein the diverging screen section diverges from the axis at an angle of about 5°-40°.

8. A centrifuge according to claim 1, wherein the helical blade comprises a plurality of helical blades.

9. A centrifuge according to claim 1, wherein the bowl further comprises a conically converging section between the cylindrical section and the conically diverging screen section, and a feed port on the conveyor hub that is aligned in a radial direction with a junction between the conically converging section and the cylindrical section.

10. A method of separating solids from liquid of a slurry, comprising:
feeding the slurry into a bowl extending about a conveyor hub;
scrolling the solids in the slurry along the bowl in a first direction and a majority of the liquid in a second direction along the bowl opposite the first direction using a helical blade extending radially outward from the conveyor hub towards the bowl, wherein the helical blade terminates upstream in the first direction of a conically diverging screen section of the bowl; and
sliding the solids along the conically diverging screen section of the bowl, wherein the conically diverging screen section reduces the coefficient of friction of the solids to a point that allows the cake formed of the solids to slide in a controlled manner forward on the conically diverging screen section with minimal back pressure but without allowing the solid cake to break loose from the conically diverging screen section and slide out of the centrifuge in an uncontrolled manner and wherein the conically diverging screen section is not aligned in a radial direction with any blade, including the helical blade, extending from the hub to the conically diverging screen section.

11. A method according to claim 10, further comprising:
scrolling the solids through a conically converging section of the bowl which is upstream in the first direction to the conically diverging screen section.

12. A method according to claim 11, further comprising:
scrolling the solids in the first direction through a cylindrical screen section of the bowl downstream of the conically converging section and upstream the conically diverging screen section.

13. A method according to claim 11, wherein feeding the slurry comprises feeding the slurry onto a junction of the cylindrical section and the conically converging section.

14. A method according to claim 11, wherein feeding the slurry comprises feeding the slurry onto the conically converging section.

15. A method according to claim 10, wherein feeding the slurry comprises feeding the slurry from the conveyor hub to the cylindrical section of the bowl.

16. A method according to claim 10, wherein the conically diverging screen section diverges from an axis of the conveyor hub at an angle of about 5°-40°.

17. A centrifuge comprising:
a conveyor including a hub rotatable about an axis and a blade extending radially from the hub and in an axial direction of the hub;
a bowl extending around the conveyor, the bowl includes a cylindrical section extending from an upstream end in a direction of solids movement of the conveyor and a conical screen expanding in a downstream direction of the conveyor, and
the blade terminates upstream of the conical screen and the conical screen is not aligned in a radial direction with any blade, including the blade, extending from the hub to the conical screen.

18. The centrifuge of claim 17 wherein the blade is a helical blade.

19. The centrifuge of claim 17 wherein the bowl further comprises a conically converging solid section between the cylindrical section and the conically diverging screen section, and a feed port for a slurry of solids and liquid on the conveyor hub which is aligned in a radial direction with a junction between the conically converging solid section and the cylindrical section.

* * * * *